US012732470B2

(12) United States Patent
Schwartz et al.

(10) Patent No.: US 12,732,470 B2
(45) Date of Patent: Sep. 8, 2026

(54) RESOURCE DISTRIBUTION ENGINE(S) FOR ALLOCATING AND SECURING RECLAIMABLE RESOURCES WITHIN A CLOUD ENVIRONMENT

(71) Applicant: NetApp, Inc., San Jose, CA (US)

(72) Inventors: Idan Schwartz, Tel Aviv (IL); Tal Ohayon, Tel Aviv (IL); Guy Yariv, Tel Aviv (IL); Oren Gurfinkel, Rishon le Zion (IL); Michael Goldberg, Tel Aviv (IL); Revital Vladimirsky, Petah Tikva (IL); Oleg Verhovsky, Ashdod (IL); Roi Kramer, Ramat Gan (IL); Shani Jacobson, Tel Aviv (IL); Shahaf Yamin, Ramat Gan (IL)

(73) Assignee: NetApp, Inc., San Jose, CA (US)

( * ) Notice: Subject to any disclaimer, the term of this patent is extended or adjusted under 35 U.S.C. 154(b) by 162 days.

(21) Appl. No.: 18/634,377

(22) Filed: Apr. 12, 2024

(65) Prior Publication Data

US 2025/0323876 A1 Oct. 16, 2025

(51) Int. Cl.

*H04L 47/70* (2022.01)
*H04L 47/78* (2022.01)
*H04L 47/83* (2022.01)

(52) U.S. Cl.

CPC .......... *H04L 47/822* (2013.01); *H04L 47/781* (2013.01); *H04L 47/83* (2022.05)

(58) Field of Classification Search

CPC ...... H04L 47/83; H04L 47/781; H04L 47/822
See application file for complete search history.

(56) References Cited

U.S. PATENT DOCUMENTS

| | | | | |
|---|---|---|---|---|
| 8,924,539 | B2 * | 12/2014 | Ferris | G06F 9/5072 709/224 |
| 9,210,031 | B1 * | 12/2015 | Kirby | H04L 41/0806 |
| 10,713,072 | B1 * | 7/2020 | Burgin | G06F 9/45558 |

(Continued)

OTHER PUBLICATIONS

Amazon Web Services, Inc., "Amazon EC2 Pricing," https://aws.amazon.com/ec2/pricing/, 5 pages, downloaded Apr. 9, 2024.

(Continued)

*Primary Examiner* — Andrew C Georgandellis

(57) ABSTRACT

Various embodiments of the present technology generally relate to systems and methods for providing a resource distribution engine. In an example, a method includes identifying, by an instance management service, a request from a cluster orchestrator to acquire computing resources associated with deployment of an application. The method may also include determining, by the instance management service, markets containing reclaimable resources suitable for the computing resources, and performing, by a resource distribution engine of the instance management service, a resource distribution process to determine a resource distribution of the reclaimable resources within the markets. The resource distribution of the reclaimable resources may include a distribution of instance type of the reclaimable resources across the markets. The method may also include securing, by the instance management service, the reclaimable resources identified by the resource distribution as provisioned reclaimable resources.

20 Claims, 9 Drawing Sheets

(56) References Cited

U.S. PATENT DOCUMENTS

| | | | | |
|---|---|---|---|---|
| 10,929,797 | B1 * | 2/2021 | Gupta | H04L 47/728 |
| 10,994,198 | B1 * | 5/2021 | Byskal | G06F 9/50 |
| 2014/0280940 | A1 * | 9/2014 | Chapman | H04L 63/02 709/225 |
| 2016/0321115 | A1 * | 11/2016 | Thorpe | G06F 11/3409 |
| 2022/0327001 | A1 * | 10/2022 | Ferreira | G06F 9/5077 |

OTHER PUBLICATIONS

Amazon Web Services, Inc., "Amazon EC2 Spot Instances," https://aws.amazon.com/ec2/spot/, 7 pages, downloaded Apr. 9, 2024.

Amazon Web Services, Inc., "Getting Started With Amazon EC2 Spot Instances," https://aws.amazon.com/ec2/spot/getting-started/, 14 pages, downloaded Apr. 9, 2024.

Microsoft, "Azure Spot Virtual Machines," https://azure.microsoft.com/en-us/products/virtual-machines/spot, 7 pages, downloaded Apr. 9, 2024.

NetApp, Inc., "What Are AWS Spot Instances?," https://spot.io/resources/aws-ec2-pricing/what-are-ec2-spot-instances/, 7 pages, downloaded Apr. 9, 2024.

NetApp, Inc., "What Are Azure Spot Instances?," https://spot.io/resources/azure-pricing/what-are-azure-spot-virtual-machines/, 3 pages, downloaded Apr. 9, 2024.

* cited by examiner

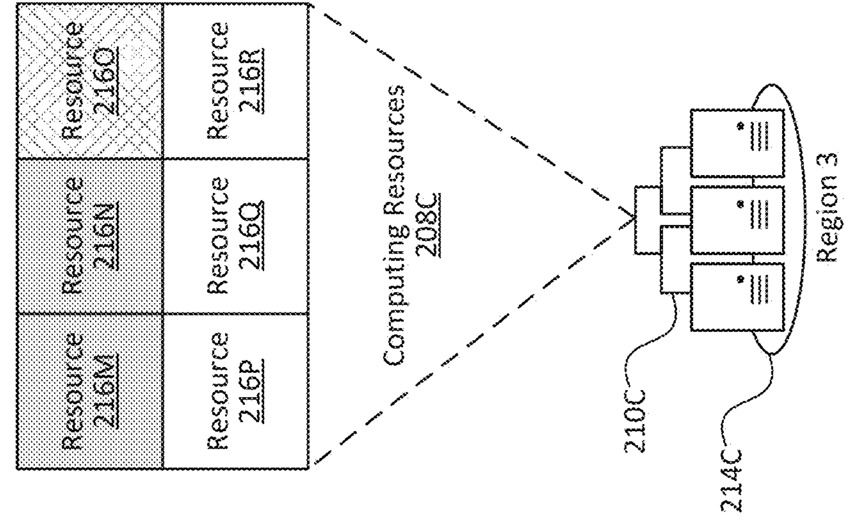
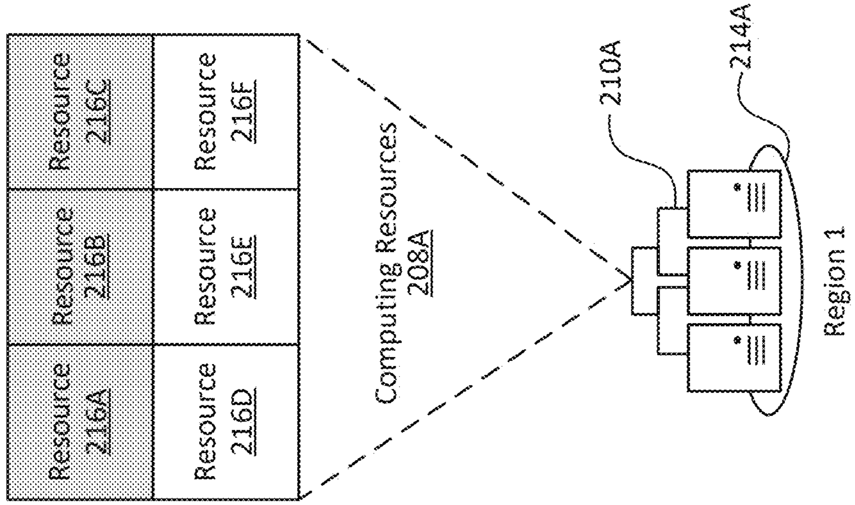
FIG. 2

300

| Computing Resource (318) | Type of Resource (320) | Resource Configuration (322) | Region (324) | Cost (326) |
|---|---|---|---|---|
| Resource 216A | On-Demand Resource | High-Processing Power | Region 1 | $ |
| Resource 216B | On-Demand Resource | Mid-Processing Power | Region 1 | $$ |
| Resource 216C | On-Demand Resource | Low-Processing Power | Region 1 | $ |
| Resource 216D | Reclaimable Resource | High-Processing Power | Region 1 | $$$ |
| Resource 216E | Reclaimable Resource | Mid-Processing Power | Region 1 | $$ |
| Resource 216F | Reclaimable Resource | Low-Processing Power | Region 1 | $ |
| Resource 216G | Reclaimable Resource | Low-Processing Power | Region 2 | $ |
| Resource 216H | Reclaimable Resource | Mid-Processing Power | Region 2 | $$ |
| Resource 216I | On-Demand Resource | Low-Processing Power | Region 2 | $ |
| Resource 216J | On-Demand Resource | High-Processing Power | Region 2 | $$$ |
| Resource 216K | Reserved Resource | Mid-Processing Power | Region 2 | $$ |
| Resource 216L | Reserved Resource | Low-Processing Power | Region 2 | $ |
| Resource 216M | On-Demand Resource | High-Processing Power | Region 3 | $$$ |
| Resource 216N | On-Demand Resource | Mid-Processing Power | Region 3 | $$ |
| Resource 216O | Reserved Resource | Low-Processing Power | Region 3 | $ |
| Resource 216P | Reclaimable Resource | High-Processing Power | Region 3 | $$$ |
| Resource 216Q | Reclaimable Resource | Mid-Processing Power | Region 3 | $$ |
| Resource 216R | Reclaimable Resource | Low-Processing Power | Region 3 | $ |

*FIG. 3*

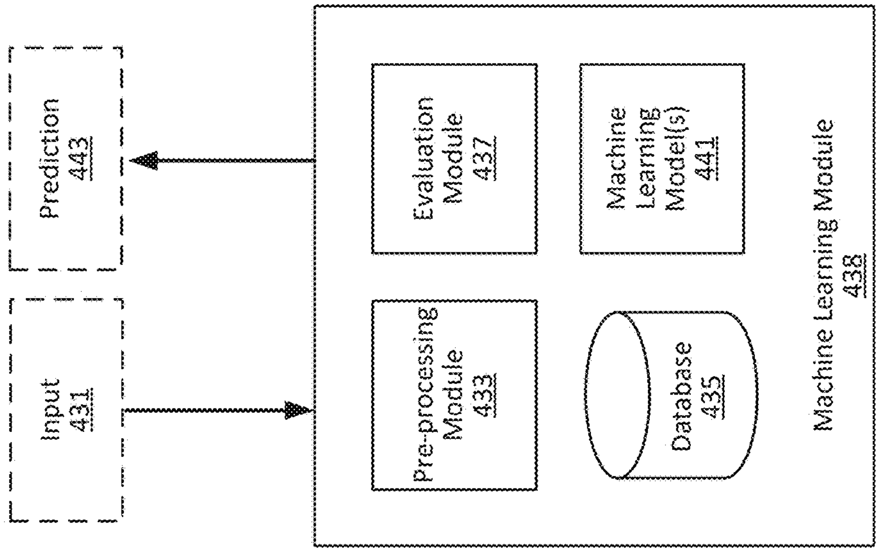
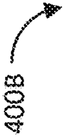
FIG. 4B

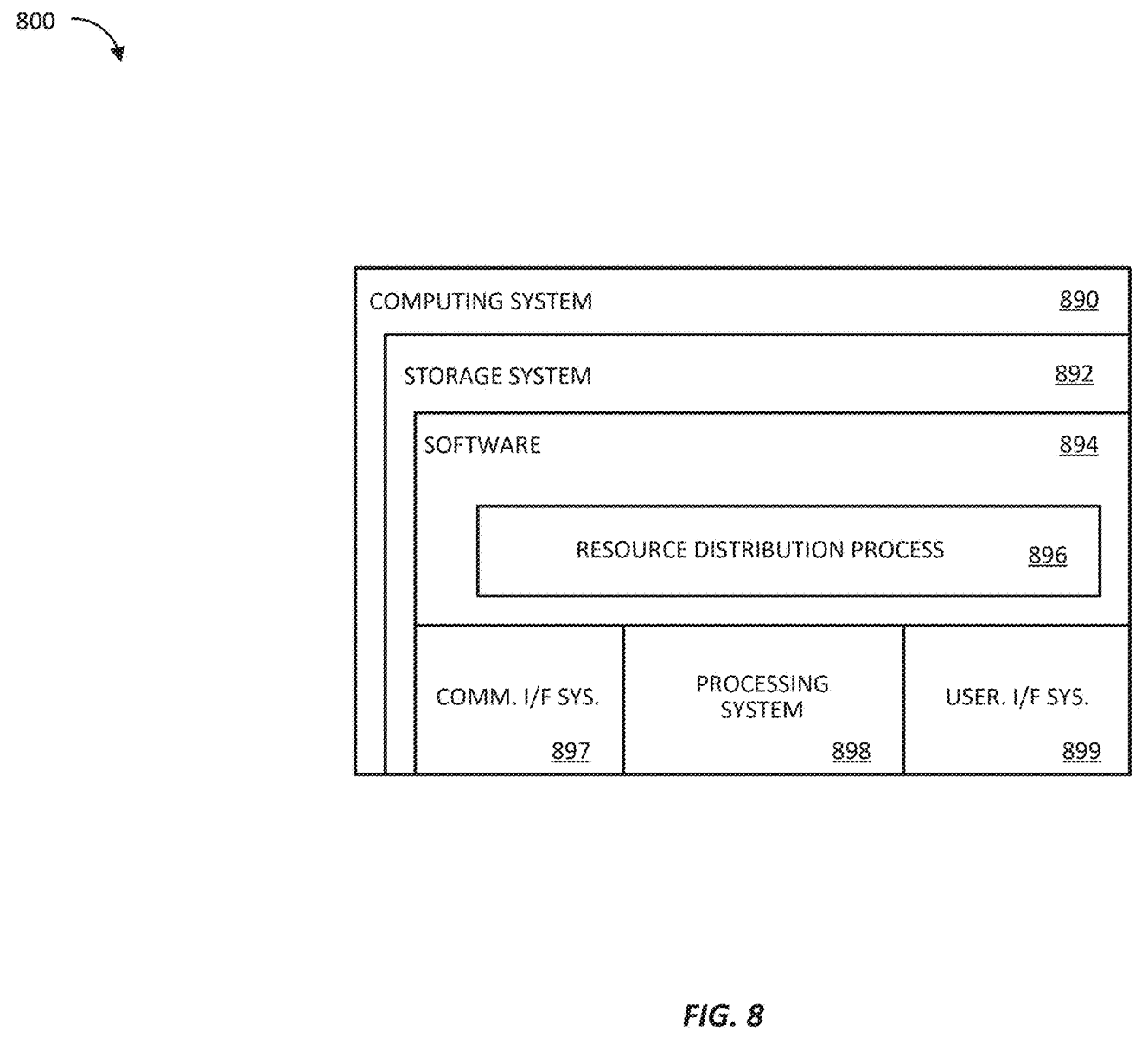

800

COMPUTING SYSTEM 890

STORAGE SYSTEM 892

SOFTWARE 894

RESOURCE DISTRIBUTION PROCESS 896

COMM. I/F SYS. 897

PROCESSING SYSTEM 898

USER. I/F SYS. 899

FIG. 8

RESOURCE DISTRIBUTION ENGINE(S) FOR ALLOCATING AND SECURING RECLAIMABLE RESOURCES WITHIN A CLOUD ENVIRONMENT

TECHNICAL FIELD

Various embodiments of the present technology generally relate to cloud environments. More specifically, embodiments of the present technology relate to systems and methods for providing resource distribution engine(s) for allocating and securing reclaimable resources within a cloud environment.

BACKGROUND

Cloud computing is a revolutionary paradigm that has transformed the way we approach and leverage computing resources in the modern era. Rather than relying solely on localized hardware and infrastructure, cloud computing allows individuals and businesses to access a vast array of computing services over the internet. It is akin to having a virtualized, on-demand data center at your fingertips, offering resources such as processing power, storage, and software without the need for direct ownership or maintenance of physical hardware. This shift from traditional, on-premises computing to the cloud is driven by the unprecedented flexibility, scalability, and cost-effectiveness it provides. Organizations can effortlessly scale their operations, only paying for the resources they consume, and quickly adapt to changing demands. The cloud fosters innovation, collaboration, and efficiency, making it an indispensable technology that is increasingly relied upon in today's fast-paced and dynamic digital landscape.

However, while the benefits of cloud computing are profound, current cloud computing approaches face challenges surrounding efficiently mapping user requests to available cloud resources. The inherent complexity of dynamic cloud environments, containing numerous virtual machines, diverse storage options, and intricate network configurations, complicates the task of optimal or efficient resource allocation. Striking the right balance between processing power, memory, and storage for each application or user request, all while minimizing costs and maintaining performance levels, remains a formidable challenge. Real-time adaptation to fluctuating workloads adds an extra layer of complexity, demanding sophisticated management and orchestration solutions.

This challenge becomes even more intricate when grappling with resource constraints, especially in scenarios where resources are sparse and have limited availability. Managing user requests and aligning them with the available cloud resources becomes a delicate balancing act under such conditions, amplifying the complexity of resource allocation. In situations where demand surpasses the availability of resources, ensuring optimal performance and user satisfaction while navigating these constraints adds an additional layer of difficulty to the intricate task of mapping requests to cloud resources.

Accordingly, there exists a need for improved systems and techniques for allocation and securing reclaimable resources within a cloud environment, such as those provided herein. In particular there is a need for resource distribution engine (s) that can determine and secure an efficient or suitable resource distribution of reclaimable resources for an application running within a cloud environment.

The information provided in this section is presented as background information and serves only to assist in any understanding of the present disclosure. No determination has been made and no assertion is made as to whether any of the above might be applicable as prior art with regard to the present disclosure.

OVERVIEW

Technology is disclosed herein for systems and techniques for providing a resource distribution engine for allocating and securing resources suitable for deployment of an application. As will be described in greater detail below, the resource distribution engine may identify available resources within one or more markets. In some cases, the resources identified as available may be reclaimable resources. As used herein, reclaimable resources may be resources that are made available by cloud service providers within respective markets from excess computing resources. A limitation of reclaimable resources, however, is that their availability may be transient since a cloud service provider may reclaim the resource on short notice. Since reclaimable resources often have dynamic availability and pricing, the resource distribution engine may determine a distribution of resources when securing or providing resources for deployment of an application.

In addition to the considering the availability and pricing of resources, the resource distribution engine may also analyze various distributions of instance type and regionality of the resources. As can be appreciated, selection of resources having similar or the same instance type or regionality may be more susceptible or at risk for service interruptions. As such, the resource distribution engine may analyze the available reclaimable resources based on instance type, regionality, and price to determine an efficient distribution of resources.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

FIG. 2 illustrates example computing resources, according to an embodiment herein.

FIG. 3 illustrates a table providing example metadata for a variety of computing resources from FIG. 2, according to an embodiment herein.

FIG. 4B illustrates an example machine learning module, according to an embodiment herein.

FIG. 8 shows an example computing device suitable for providing a resource distribution engine, according to an embodiment herein.

Figure 1:
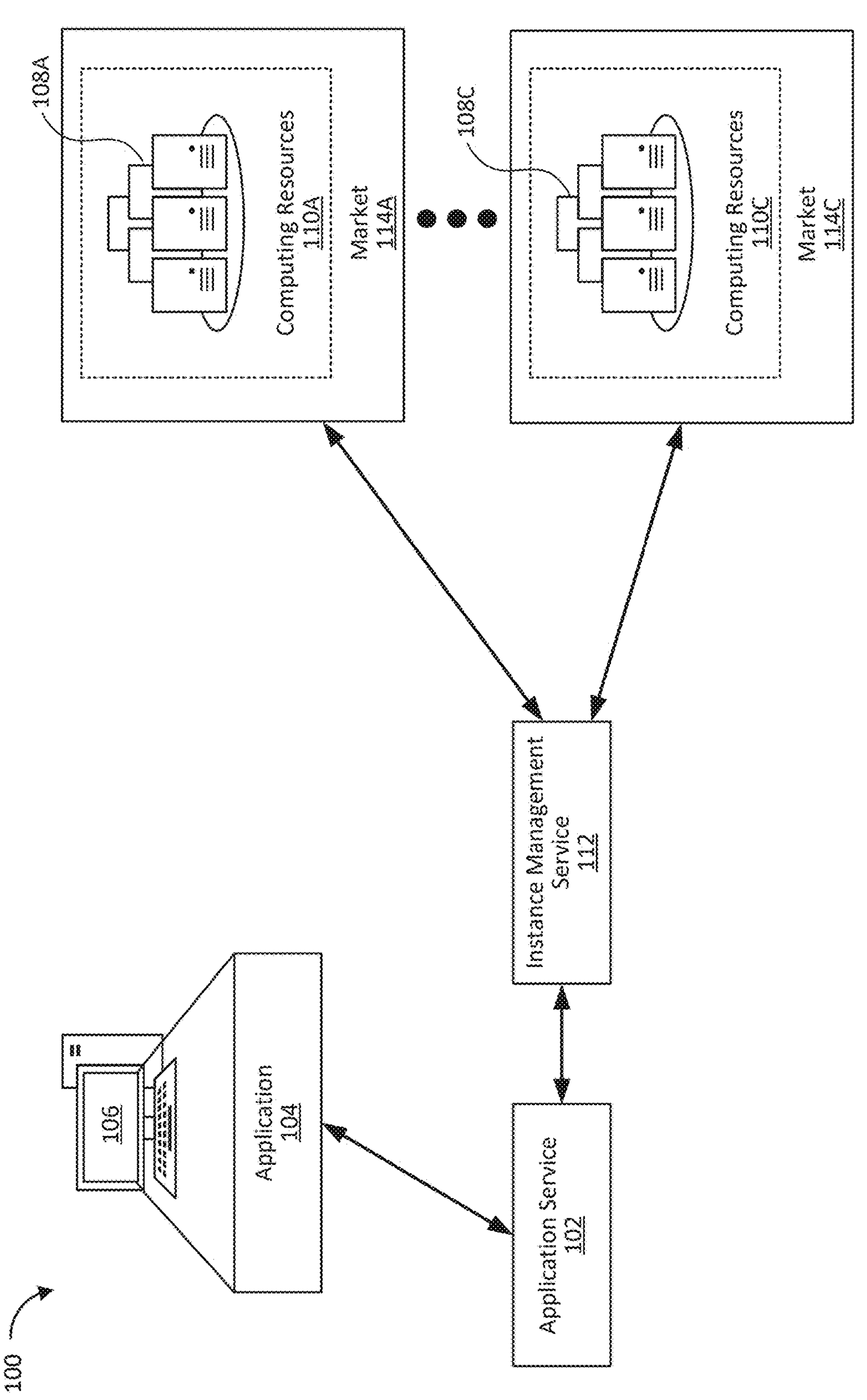
FIG. 1 illustrates an example operational environment for a system in which computing resources are provisioned to an application hosted within a cloud computing environment, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Cloud computing has revolutionized our approach to computing resources, offering individuals and businesses access to a vast array of services over the internet. It's akin to having a virtualized, on-demand data center at your fingertips, providing processing power, storage, and software without the need for physical hardware ownership or maintenance. This shift from traditional on-premises computing to the cloud is driven by its unprecedented flexibility, scalability, and cost-effectiveness, allowing organizations to effortlessly scale operations, adapt to changing demands, and foster innovation and efficiency in today's dynamic digital landscape.

However, despite the profound benefits of cloud computing, efficiently mapping of user requests to available resources poses significant challenges. The complexity of dynamic cloud environments, with numerous virtual machines, diverse storage options, pricing structures, and intricate network configurations, complicates optimal or efficient resource allocation. Balancing processing power, memory, and storage while minimizing costs and maintaining performance levels remains challenging, especially with real-time workload fluctuations demanding sophisticated management solutions. Additionally, resource constraints further intensify this challenge, particularly in scenarios where resources are sparse, requiring delicate balancing acts to ensure optimal performance and user satisfaction amidst constraints.

To address application or user demand, organizations often utilize reclaimable resources to maintain efficient and scalable operations. Reclaimable resources are utilized within cloud environments to leverage excess computing capacity at significantly reduced costs (e.g., up to 90% less). That is, cloud service providers, such as Amazon Web Services (AWS) or Google Cloud Platform (GCP), make excess computing capacity available to users as reclaimable resources. Reclaimable resources enable users to bid on unused resources, offering substantial savings compared to traditional on-demand instances. Organizations can take advantage of reclaimable resources for various workloads, such as batch processing, data analysis, or testing, where flexibility in instance availability outweighs the need for continuous uptime. Example scenarios in which reclaimable resources are often utilized include workloads that can tolerate interruptions (e.g., batch processing, high performance computing, video and visual rendering, large scale data processing) and large scale stateless instances where users can scale out using reclaimable resources with guaranteed availability from reserved or dedicated instances.

While reclaimable resources provide cost-effective options, they come with the caveat of potential interruptions, as cloud service providers may reclaim these instances with short notice (e.g., two minutes notice). The cloud provide might, for example, terminate the reclaimable instances based on a variety of factors such as overall capacity and availability. More specifically, if there are not enough instances to supply more profitable instances (e.g., dedicated or reserved instances) the cloud provide can initiate termination. As another example, if demand increases or instance prices exceed bid prices, the cloud provider may reclaim (or pull the plug) on the reclaimable resources. Once the user is notified that the resource is being reclaimed, after the notification period ends (e.g., after two minutes), the instance may be terminated, stopped (e.g., making it possible to restart it with the same launch specifications), or placed into hibernation.

Reclaimable resources present several challenges for users, primarily revolving around their transient nature and potential for interruption. One major challenge is the unpredictability of instance prices, which can fluctuate based on supply and demand dynamics within the cloud provider's infrastructure. Sudden spikes in instance prices may lead to instances being terminated abruptly (e.g., in less than 120 seconds) if the bid price exceeds the current instance price, disrupting ongoing workloads. Additionally, the ephemeral nature of reclaimable resources introduces challenges in designing fault-tolerant and resilient architectures, as applications must be able to gracefully handle instance terminations and data loss. Furthermore, the risk of reclamation by the cloud provider of the reclaimable resource due to increased demand or capacity constraints requires careful monitoring and management to ensure continuity and reliability of services.

Despite these challenges, users continue to rely on reclaimable resources for their cloud computing needs, at least due to the compelling cost savings (e.g., up to 90%) provided by reclaimable resources. As such, there is a need for improved system and techniques for allocating and securing reclaimable resources that mitigate or reduce the above issues. That is, there is a need for systems and techniques to allocate and secure reclaimable resources having minimal risk of service interruption.

To address the above challenges of mapping user requests to suitable reclaimable resources, example resource distribution engine(s) are provided herein. As will be described in greater detail below, the resource distribution engine(s) provided herein identify reclaimable resources suitable for the computing resource needs of a received request. In particular, the resource distribution engine(s) determine a resource distribution of the reclaimable resources. The resource distribution, also referred to herein as the efficient resource distribution, may include a distribution of instance type of the reclaimable resources, a regional distribution of the reclaimable resources, and/or predicted availability (or eviction rate) of the reclaimable resources. Once a resource distribution is determined, the resource distribution engine(s) may secure the corresponding reclaimable resources and establish a connection between the reclaimable resources and a respective cluster orchestrator.

By determining the resource distribution of reclaimable resources, the resource distribution engine creates a resilient infrastructure for clients, minimizing service interruptions and ensuring reliable performance for users, all while optimizing instance price and overall efficiency of computing resources. To establish a resilient infrastructure for clients, the resource distribution engine may determine a distribution of instance type, each with distinct configurations of CPU, memory, and resources, for available reclaimable resources. A distribution of instance type may include a diversification in instance type that not only meets the needs of the respective application but provides the most resilience against service interruption and fault tolerance. By determining a distribution of instance type, thus allowing the application to deploy workloads across a variety of instance types, the resource distribution engine mitigates the risk of service interruptions or performance degradation caused by hardware failures or maintenance events affecting a single instance type. Moreover, leveraging different instance types can optimize costs and performance based on workload characteristics, ensuring efficient resource utilization and scalability.

In addition to determining a distribution of instance type, the resource distribution engine may also determine a regional distribution of computing resources. By diversifying the computing resources across different geographical regions, the resource distribution engine can further enhance the resiliency of the secured instances for clients. By diversifying computing resources across different regions, the resource distribution engine ensures that applications remain accessible even if an entire region faces issues or outages. In some cases, the resource distribution engine may use a multi-cloud strategy, leveraging services from more than one cloud provider or market. This approach mitigates the impact of disruptions specific to a particular cloud platform or market.

Accordingly, the various embodiments of the present technology provide for a wide range of technical effects, advantages, and/or improvements to computing systems and components, in particular within for cloud computing systems. For example, various embodiments may include one or more of the following technical effects, advantages, and/or improvements: 1) unconventional and non-routine operations for allocating and securing computing resources within a cloud environment; 2) dynamic integration of resource distribution engines into traditional instance management services; 3) automatically optimizing resource distribution across instance type and/or geographical region; 4) use of resource distribution engine(s) to increase infrastructure resilience and reduce service interruptions; and/or 5) changing the manner in which a computing system allocates and secures computing resources for providing applications and services within cloud environments. Some embodiments include additional technical effects, advantages, and/or improvements to computing systems and components.

Turning now to the Figures, FIG. 1 illustrates an example operational environment of a system 100 in which computing resources are provisioned to an application hosted within a cloud computing environment, according to an embodiment herein. In the illustrated example, an application service 102 hosts an application 104. For example, the application service 102 may be a weather service that provides users with a weather application (e.g., the application 104). Users may interact with the application 104 via a client device, such as the client device 106. It should be appreciated, that while FIG. 1 illustrates a single client device 106 interacting with a single application 104, there may be any number of client devices 106 and any number of applications 104. The client device 106 and the application 104 may be representative of all client devices 106 interacting with the applications 104 hosted by the application service 102 at a given time.

Broadly speaking, the client device 106 may include personal computers, tablet computers, mobile phones, gaming consoles, wearable devices, Internet of Things (IoT) devices, and any other suitable devices, of which computing apparatus 800 in FIG. 8 is also broadly representative. As such, the client device 106 may communicate with the application service 102 via one or more internets and intranets, the Internet, wired and wireless networks, local area networks (LANs), wide area networks (WANs), or any other type of network or combination thereof. In particular, the client device 106 may interact with the application service 102 through network requests, accessing and utilizing the application's 104 functionality via application interfaces (APIs) or user interfaces provided by the application service 102.

As the application service 102 does not own or have access to any computing resources of its own, the application service 102 may utilize cloud computing services to deploy the application 104. That is, the application service 102 provisions the necessary computing resources within the cloud environment to host the application 102. For example, the application service 102 may use a container orchestration platform, such as Kubernetes, to manage the deployment, scaling, and operation of the application 104. As will be described in greater detail below, the container orchestration platform may include a cluster coordinator that orchestrates the provisioning of computing resources for the application 104 based on user demand.

As illustrated, computing resources 108A-C may be available on various markets 114A-C, each catering to different needs and preferences of users. It should be appreciated that while only three markets 114A-C and groups of computing resources 108A-C are illustrated, there may be any number of markets 114A-C and/or groups of computing resources 108A-C. For ease of illustration, the number of markets 114A-C and computing resources 108A-C is limited.

The markets 114A-C may include the public cloud market, where major cloud service providers such as AWS and GCP offer a wide range of scalable computing resources 108A-C on a pay-as-you-go basis. In some cases, the markets 114A-C may include secondary markets, such as the reclaimable market, where users can bid for excess capacity at discounted prices, allowing for cost-effective resource utilization. In still further cases, the markets 114A-C may include private cloud markets which include computing resources within a dedicated infrastructure, offering greater control and security for organizations with specific compliance or regulatory requirements. Other markets contemplated herein include emerging markets, such as edge computing and hybrid cloud environments, which offer distributed computing resources closer to end-users or specific locations, enabling low-latency and data sovereignty requirements to be met.

The computing resources 108A-C are generally hosted on one or more servers 110A-C, respectively, which serve as the physical infrastructure that powers the provisioned computing services and applications, such as the application 104. As those skilled in the art readily appreciate, the servers 110A-C are specialized computers designed to handle processing, storage, and networking tasks efficiently. Typically, the servers 110A-C consist of CPUs (Central Processing Units), ample amounts of RAM (Random Access Memory), and storage devices such as hard disk drives (HDDs) or solid-state drives (SSDs). In data centers or cloud environments, servers 110A-C are organized into clusters or racks, interconnected through high-speed networks to enable communication and resource sharing. Virtualization technologies further optimize server utilization by allowing multiple virtual machines, instances, or containers to run on a single physical server, maximizing resource efficiency.

To provision the computing resources within a cloud environment, the application service 102 may then interact with an instance management service (IMS) 112 to allocate and secure the computing resources necessary to meet the identified requirements. The IMS 112 may be a software component or service that provisions, monitors, and manages virtual machine instances ("instances") within the cloud environment. For example, the IMS 112 ensures the proper configuration and maintenance of the servers 110A-C to assure uptime, reliability, and security for hosted computing resources 108A-C. As can be appreciated, by assuring uptime, reliability, and security of the computing resources 108A-C, the IMS 112 safeguards against service interruption for the application 104, thereby providing an improved user experience for the client device 106.

Another role of the IMS 112 is to facilitate efficient resource allocation for the application service 102 to meet the dynamic computing needs of the application 104. As those skilled in the art readily appreciate, the computing resource needs of the application 104 generally fluctuates depending on user requests. Following the above weather application example, when a winter storm is impending, more users via client devices, such as the client device 106, may interact with the application 104 to track the storm and see the forecast. As such, during these times, the application service 102 may require more computing resources to meet the increased user demand.

Once the IMS 112 identifies one or more computing resources 108A-C sufficient to meet the needs of the application service 102, the IMS 112 may secure or otherwise provision the computing resources 108A-C for the application service 102. Once provisioned, the IMS 112 may establish a connection between the secured computing resources 108A-C and the application service 102 so that the secured computing resources 108A-C can be configured appropriately. That is, once secured by the application service 102, the secured computing resources 108A-C may be configured with the necessary software dependencies and configurations required to run the application 104 effectively. Once the secured computing resources 108A-C are up and hosting the application 104, the application service 102 may continuously monitor the computing resources 108A-C and scale them up or down based on workload demands of the application 104, ensuring optimal performance and resource utilization.

Referring now to FIG. 2, example computing resources 208A-C are illustrated, according to an embodiment herein. The computing resources 208A-C, which may be the same or similar to the computing resources 108A-C, may be hosted on one or more servers 210A-C, respectively. As shown, the servers 210A-C may be part of different markets 214A-C, which may include one or more of public markets, reclaimable markets, private markets, or emerging markets, as described above.

Each of the markets may be located in a geographical region. In the illustrated example, the market 214A may be in Region 1, the market 214B may be in Region 2, and the market 214C may be in Region 3. It should be appreciated that the illustrated regional distribution of the markets 214A-C is overly simplified and in reality, each of the markets 214A-C may be spread across multiple geographical regions. For example, a first subset of the servers 210A within the market 214A may be in a first geographical region, while a second subset of the servers 210A within the market 214A may be in a second geographical region.

Each of the computing resources 208A-C may include individual resources 216A-R. The resources 216A-R may be used in combination with one another to create an instance, as required by an application service, such as the application service 102. As those skilled in the art readily appreciate, in cloud computing an "instance" generally refers to a virtualized computing environment. An instance typically consists of CPU, memory, storage, and networking resources. Instances can be configured with specific hardware specifications and operating systems to meet the needs of various workloads, such as web hosting, application development, or data processing. In other words, a provisioned instance has an instance type which refers to a specific configuration or model of virtual machine created by combining or pooling one or more of the resources 216A-R together. The instance type may be designed to meet different computing needs and is characterized by its combination of CPU, memory, storage, and network capacity.

The resources 216A-R may encompass a diverse range of components to address the multifaceted requirements of modern digital services and workloads. As noted above, by providing a wide range of components, the resources 216A-R can be combined in various ways to meet the varied workloads and applications hosted in the cloud, each of which demand specific computing capabilities for optimal performance. For instance, CPU cores are essential for general-purpose computational tasks, while abundant RAM facilitates efficient data processing and manipulation. Additionally, specialized hardware accelerators like GPUs or TPUs cater to workloads requiring parallel processing, such as AI training or scientific simulations. Moreover, diverse storage options, including SSDs and HDDs, accommodate varying data storage and access patterns, ensuring efficient data management and retrieval. Networking capabilities further enhance the infrastructure by enabling seamless communication and data transfer between different components. Ultimately, the inclusion of a diverse range of computing resources 216A-R in cloud environments allows for flexibility, scalability, and optimized performance tailored to the unique needs of each application, supporting the dynamic landscape of cloud computing.

As illustrated, the resources 216A-R include a variety of resource types. For example, the resources 216A-C of the computing resources 208A, 216I-J of the computing resources 208B, and 216M-N of the computing resources 208C may be on-demand resources. On-demand resources in cloud computing refer to computing resources, such as virtual machines, storage, and networking, that can be provisioned and utilized instantly, without the need for long-term commitments or upfront payments. Users can access on-demand resources on a pay-as-you-go basis, scaling resources up or down dynamically based on their changing needs. This flexibility enables organizations to rapidly deploy and scale infrastructure to support varying workloads, optimizing resource utilization and reducing operational costs.

The resources 216A-R may also include reserved resources, such as the resources 216K-L of the computing resources 208B and the resource 2160 of the computing resource 208C. Reserved resources in cloud computing are computing resources, such as virtual machines or instances, that users commit to for a specified term, typically one to three years, in exchange for discounted pricing compared to on-demand usage. By reserving resources in advance, users can secure capacity and predict costs, making it suitable for steady-state workloads with predictable usage patterns. Reserved resources offer cost savings benefits, particularly for applications with consistent demand, but may lack the flexibility of on-demand resources in adapting to changing workload requirements.

Additionally, the resources 216A-R may also include reclaimable resources, such as the resources 216D-F of the computing resources 208A, the resources 216G-H of the computing resources 208B, and the resources 216P-R of the computing resources 208C. Reclaimable resources in cloud computing are computing resources, such as virtual machines or instances, that are made available for users to bid on at a discounted rate compared to standard on-demand prices. Typically, reclaimable resources are excess computing resources that a cloud service provider or market has at a given time that they make available for purchase. A limitation of reclaimable resources, however, is that the cloud service provider may reclaim the reclaimable resource on short notice (e.g., 2-3 minutes) if demand for the resource increases. In other words, reclaimable resources may be revoked and are generally transient in nature. To compensate for its unpredictable availability, reclaimable resources are generally offered at reduced pricing. As such, applications services often utilize reclaimable resources to achieve more efficient service.

Referring now to FIG. 3, a table 300 is illustrated providing example metadata for each of the resources 216A-R, according to an embodiment herein. As shown, the table 300 provides metadata for each of the resources 216A-R listed in column 318, including a resource type 320, a resource configuration 322, a region 324, and cost 326. As indicated by the resource type 320, the resources 216D-H and 216P-R are reclaimable resources. For ease of explanation, the remaining discussion will focus on these resources, however, it should be appreciated that the discussion is equally applicable to the remaining resources 216A-C and 216I-0.

In the illustrated example, the resources 216D and 216P have a high-processing power configuration, as indicated by the resource configuration 322. A high-processing power configuration may be a configuration that provides ample computation power, memory capacity, and fast storage and networking capabilities suitable for demanding workloads such data analytics, machine learning, scientific simulations, or high-traffic web applications. For example, the resources 216D and 216P may have the following configuration:

TABLE 1

| | |
|---|---|
| CPU Core: | 16 vCPUs (virtual Central Processing Units) |
| Memory Size: | 64 GB RAM (Random Access Memory) |
| Disk Type: | SSD (Solid State Drive) storage for fast I/O operations, with a storage capacity of 500 GB |
| Network Throughput: | 10 Gbps (Gigabits per second) network throughput for high-speed data transfer and communication |

In the illustrated example, the resources 216E, 216H, and 216Q have a mid-processing power configuration, as indicated by the resource configuration 322. A mid-processing power configuration may be a configuration that provides a balance between computational power, memory capacity, and storage performance, making it suitable for general-purpose workloads such as web servers, application servers, or small-scale databases. The network throughput of a mid-processing power configuration is sufficient for typical networking tasks, while the HDD storage provides cost-effective storage solutions for moderate data storage requirements. For example, the resources 216E, 216H, and 216Q may have the following configuration:

TABLE 2

| | |
|---|---|
| CPU Core: | 4 vCPUs |
| Memory Size: | 16 GB RAM |
| Disk Type: | HDD (Hard Disk Drive) storage for basic storage needs, with a storage capacity of 250 GB |
| Network Throughput: | 1 Gbps network throughput for standard networking requirements |

In the illustrated example, the resources 216F-G and 216R have a low-processing power configuration, as indicated by the resource configuration 322. A low-processing power configuration may be a configuration that is suitable for lightweight workloads with minimal processing demands, such as small-scale web applications, development and testing environments, or administrative tasks. The limited number of CPU cores and memory size are sufficient for handling basic computational tasks, while the HDD storage and lower network throughput meet modest storage and networking needs. For example, the resources 216E, 216H, and 216Q may have the following configuration:

TABLE 3

| | |
|---|---|
| CPU Core: | 2 vCPUs |
| Memory Size: | 8 GB RAM |
| Disk Type: | Standard HDD storage for basic storage needs, with a storage capacity of 100 GB |
| Network Throughput: | 100 Mbps (Megabits per second) network throughput for basic networking requirements |

It should be appreciated that the above example resource configurations provided in Table 1-Table 3, are illustrative and these specifications may vary depending on the computing resource.

In addition to having different resource configurations 322, each of the resources 216D-H and 216P-R may have different geographic regions 324. For example, the resources 216D-F may be in Region 1, the resources 216G-H may be in Region 2, and the resources 216P-R may be in Region 3. Each of the Regions 1-3 may be operationally independent and offer different sets of services, pricing, and performance characteristics.

As noted above, reclaimable resources, such as the resources 216D-H and 216P-R, have fluctuating pricing based on the supply and demand dynamics of a respective market. As such, the pricing 326 provided in Table 300 is illustrative of a snapshot in time for the resources 216D-H and 216P-R. As such, it should be appreciated that pricing 326 for the resources 216D-H and 216P-R may fluctuate or change based on each respective market's dynamic. In addition to market demands, the processing power configurations may also impact the pricing 326 for the resources 216D-H and 216P-R. As shown, high-processing power configurations, such as for the resources 216D and 261P have the highest price, indicated by $$$, mid-processing power configurations, such as the resources 216E, 216H, and 216Q, have a medium price, indicated by $$, and low-processing power configuring, such as the resources 216F-G and 216R have the lowest price, indicated by $. Again, the pricing 326 is meant to be illustrative and pricing may vary depending on application.

When an application service, such as the application service 102, provisions computing resources, such as the resources 216D-H and 216P-R, the application service considers several factors. To ensure optimal performance, efficiency, and cost-effectiveness, the application service 102 may first consider the workload requirements of the corresponding application 104, such as determining the necessary computing power, memory, storage and network capabilities. Additional factors such as the type of application, expected traffic volume, and data processing needs may also influence the choice of resources. Following the above weather application example, if the weather application is a simple application in which weather forecasts generated by other sources are provided to users, then the computing resources required may need minimal processing power. However, if the weather application is a forecast modeling software in which amateur or professional meteorologists can generate and model various weather patterns, then the computing resources may require high processing power, as well as fast storage and networking capabilities to meet the demands of the modeling software.

Additional considerations for selecting computing resources include geographical location, compliance requirements, and service-level agreements (SLAs), all of which may influence the selection of regions and markets for computing resources. Moreover, pricing, scalability, and flexibility of the computing resources and the respective application play into what computing resources are selected. As those skilled in the art readily appreciate, selecting computing resources involves a holistic evaluation of technical, operational, and financial aspects to meet the specific needs and objections of the application service 102 and/or application 104.

Figure 4A:
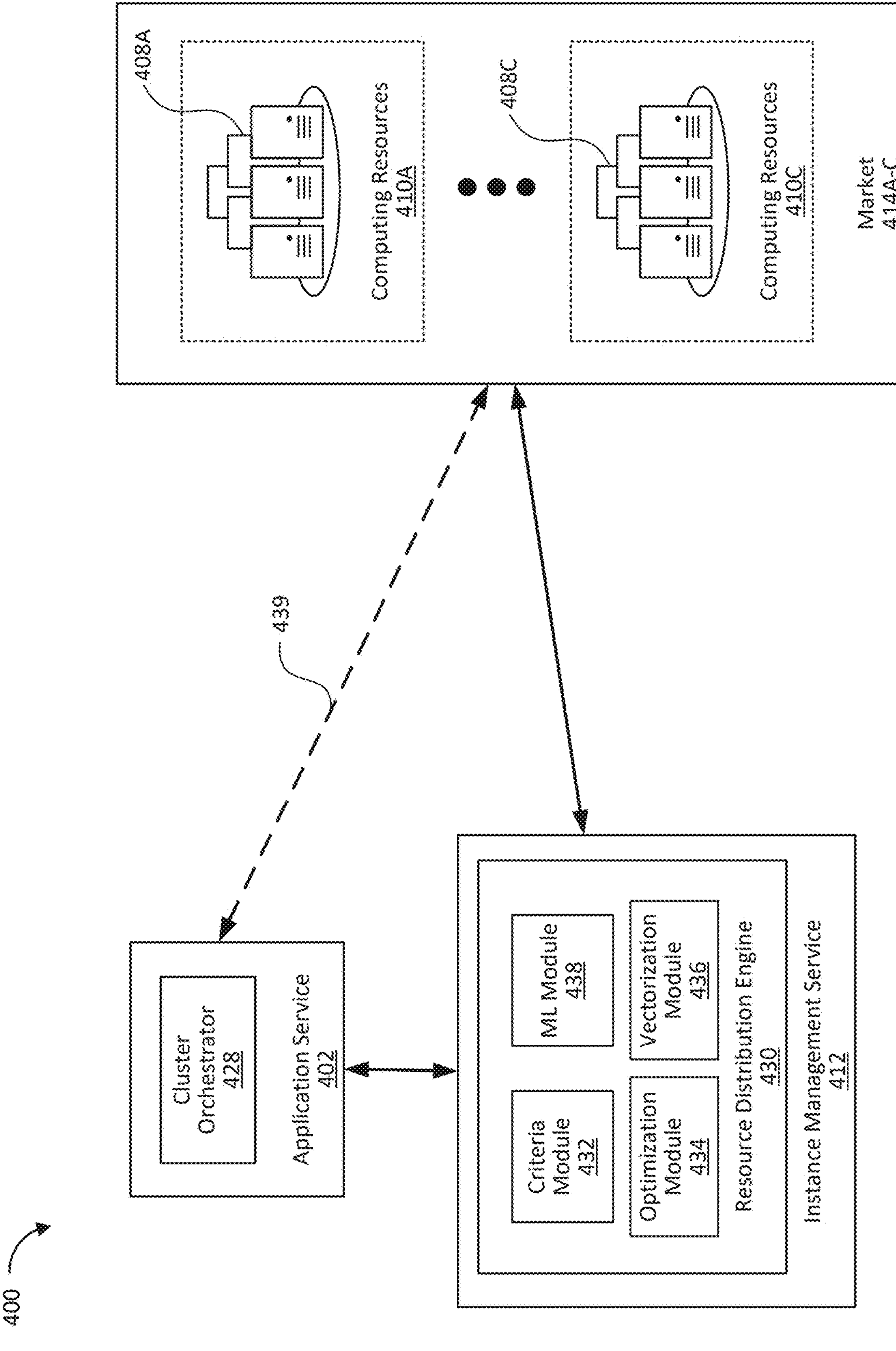
FIG. 4A illustrates an example operational environment for providing a resource distribution engine, according to an embodiment herein.

Referring now to FIG. 4A, an example operational system 400 for providing a resource distribution engine 430 for allocating and securing computing resources is illustrated, according to an embodiment herein. As described above, mapping user request to suitable computing resources presents numerous challenges, including selecting computing resources to minimize or prevent service interruptions without negatively impacting the efficiency, financial and operational, of the underlying application. As explained herein, the resource distribution engine 430 addresses these challenges by allocating and securing computing resources having a resource distribution.

As shown, the system 400 includes an application service 402, which may be the same or similar to the application service 102. In particular, the application service 402 may provide an application, such as the application 104 to a client device, such as the client device 106. The application 104 may be provisioned and hosted within a cloud environment and as such may be executed on one or more instances. The instances needed to execute the application 104 may be created or built from computing resources 408A-C hosted on one or more servers 410A-C, respectively. As described above, the computing resources 408A-C may include individual resource units, such as the resources 416A-R, that are hosted within a variety of markets 414A-C.

To aid the applications service 402 in securing or otherwise provisioning the necessary computing resources 408A-C to meet the demands of the application 104, the application service 402 may interact with an IMS 412. The IMS 412 may be similar or the same as the IMS 112. As noted above, the IMS 412 may orchestrate the provisioning of the computing resources 408A-C, as well as monitor the computing resources 408A-C. The IMS 412 may monitor the computing resources 408A-C prior to provisioning (e.g., market pricing and availability or eviction pattern) and monitor the computing resources 408A-C once provisioned to mitigate against service interruptions.

In the illustrated example, the application service 402 includes a cluster orchestrator 428. The cluster orchestrator 428 may be a component within the system 400 responsible for managing and coordinating the deployment, scaling, and operation of applications, such as the application 104, across a cluster of virtual or physical machines. In other words, the cluster orchestrator 428 acts as a conductor, harmonizing the various components of a distributed system formed by the computing resources 408A-C to ensure efficient resource utilization and optimal performance. In an example embodiment, the cluster orchestrator 428 may be or include Kubernetes and as such may manage containerized applications across a cluster of instances.

The cluster orchestrator 428 interacts with the application service 402 during the deployment phase of the application 104. For example, the cluster orchestrator 428 may receive instructions from a user, such as a user of the client device 106, or the deployment configuration to deploy the application service 402, thereby providing the application 104 to the client device 106. Responsive to the instructions, the cluster orchestrator 428 may schedule the deployment, orchestrating the creation of necessary resources, such as pods, which encapsulate the application's 104 containers, along with any associated services, volumes, and network configurations.

The cluster orchestrator 428 may also interact with the IMS 412 to request computing resources 408A-C to serve as virtual machines or physical nodes for the deployment and running of various application components. As can be appreciated, the cluster orchestrator 428 may rely on the IMS 412 to provision and manage the computing resources 408A-C. As such, the cluster orchestrator 428 coordinates the interactions between the application service 402 it hosts and the IMS 412, which provides the underlying computing resources 408A-C for the application service 402 and application 104.

Figure 5:
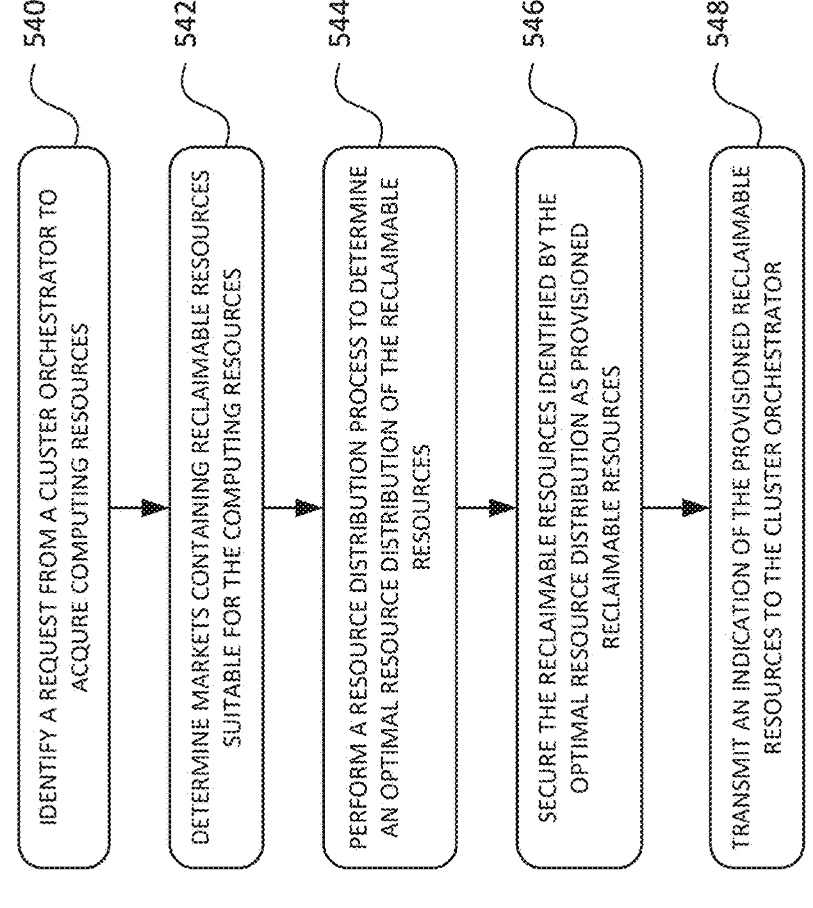
FIG. 5 illustrates an example process for providing a resource distribution engine, according to an embodiment herein.

For ease of explanation, the remaining discussion of FIG. 4A is made with reference to FIG. 5. FIG. 5 provides an example process 500 for providing a resource distribution engine, according to an embodiment herein. While the process 500, which may be referred to herein as a resource distribution engine process, is described with respect to FIG. 4A, it should be appreciated that it is equally applicable to other systems and components provided herein. Additionally, while the process 300 illustrates steps 540, 542, 544, 546, and 548, the process 500 is not limited to these steps and may include additional steps or may lack one or more of these steps. That is, the steps 540-548 are provided to illustrate the resource distribution engine process, not limit it to these steps.

As noted above, the cluster orchestrator 428 may interact with the IMS 412 to request one or more of the resources 408A-C. As such, the IMS 412 may identify a request to acquire computing resources 408A-C associated with the deployment of an application, such as the application 104 (540). Although in this example, the request is received from the cluster orchestrator 428 it should be appreciated that the IMS 412 may receive the request to acquire the computing resources 408A-C from another source, such as the application service 402.

Responsive to identifying the request, the IMS 412 may determine one or more computing resources from the computing resources 408A-C suitable for supporting the deployment of the application 104. In particular, the IMS 412 may identify and provision one or more of the resources 216A-R from the computing resources 408A-C for the cluster orchestrator 428. To identify which resources 216A-R to provision, the IMS 412 may initially determine markets containing resources suitable for meeting the computing resource needs identified by the request (542). In particular, the IMS 412 may determine markets 414A-C containing reclaimable resources suitable for the computing resource needs of the application service 402. As described above, application services increasingly source reclaimable resources for their computing resource needs due to the cost-saving opportunities provided by the reclaimable resources.

To determine which markets 414A-C contain available reclaimable resources, the IMS 412 may interact with each of the markets 414A-C via APIs provided by a respective cloud service provider. Through the APIs, the IMS 412 may query the availability and pricing of the reclaimable resources within each market 414A-C. The IMS 412 may monitor the availability and pricing of reclaimable resources within the markets 414A-C in real time, collecting data on reclaimable resource pricing, instance types, and availability zones.

In the illustrated example, the IMS 412 may determine that within the markets 414A-C, available reclaimable resources include the resources 216D-H and 216P-R. Once the available reclaimable resources are identified, the IMS 412 may determine a resource distribution of the reclaimable resources within the markets 414A-C. In particular, the resource distribution engine 430 within the IMS 412 may perform a resource distribution process to determine a distribution of the reclaimable resources (544). As can be appreciated, the reclaimable resources available at a given time within the markets 414A-C may be beyond the resource needs of the request. As such, the resource distribution engine 430 may determine a combination of the resources 216D-H and 216P-R to meet the resource needs of the request.

As noted above, a current challenge of cloud computing environments is service interruptions. To mitigate the risk of service interruptions, the resource distribution engine 430 may determine a resource distribution of instance type and/or a regional distribution of the resources. That is, when provisioned computing resources are concentrated to the same type of node or resource (e.g., forming a cluster having a homogenous node configuration), then the system becomes vulnerable to disruptions caused by isolated failures or fluctuations in demands. In scenarios where demand exceeds the capacity of the concentrated resources or when a failure occurs in a critical area, service interruptions become more likely. By diversifying allocation of the computing resources, the resource distribution engine 430 secures a distribution of resources that is able to seamlessly redirect workloads and adapt to changing conditions. In other words, the resource distribution provided by the resource distribution engine enhances the overall resilience of the service provided by the resources, minimizing the impact of service interruptions, and ensuring a more robust and reliable performance even in the face of unexpected challenges.

As shown, the resource distribution engine 430 may include a criteria module 432. As part of the request to provision the computing resources, the request may include criteria for the computing resources. That is, the criteria may include requirements for the computing resources as indicated by the cluster orchestrator 428. For example, the criteria may include the capacity of the resource, the type of hardware (e.g., GPU instance) or processing power, and the region of the resource (e.g., Region 1). The criteria module 432 may store the criteria of the request and/or filter the available reclaimable resources identified by the IMS 412.

After the resources 216D-H and 216P-R are identified by the IMS 412 as available within the markets 414A-C, the resource distribution engine 430 may filter the resources 216D-H and 216P-R based on the criteria. In particular, the criteria module 432 may filter the resources 216D-H and 216P-R based on the criteria to remove any unsuitable resources. Unsuitable resources may be resources that do not meet the criteria. For example, with reference to FIG. 3, the criteria may include a requirement for mid-to-high processing power within Regions 1 and 2. As such, the resource distribution engine 430 may determine that resources 216P-R are unsuitable resources because they do not meet the region requirement of the criteria and resources 216F-G are unsuitable resources because they do not meet the processing power requirement of the criteria. As such, from the filtering process, the resource distribution engine 430 may determine that of the available resources 216D-H and 216P-R, the resources 216D-E and 216H are suitable resources. As noted above, this is a simplified illustration and in reality, there may be hundreds if not thousands of resources that the resource distribution engine 430 is filtering and analyzing, according to the processes and techniques described herein.

Once the unsuitable resources are removed, the resource distribution engine 430 may analyze the remaining, suitable resources 216D-H and 216P-R to determine a resource distribution. To determine a resource distribution, the resource distribution engine 430 may include a vectorization module 436. The vectorization module 436 may compute a computing resource vector for each virtual node group (VNG) within each of the markets 414A-C. A VNG is a grouping of computing resources, such as a subset of 216D-H and 216P-R, that when pooled together fulfill or meet the criteria set forth in the request. In the context of the cluster orchestrator 428, a VNG is a group of computing resources that when combined meet the requirements of containers running within a given cluster for which the request was made. As those skilled int eh art readily appreciate, a VNG provides a single layer of abstraction that enables users to manage different types of workloads on the same cluster. For example, VNGs may allow the Kubernetes framework to select different types of servers with virtualization. Without VNGs, all workloads would run on the same type of instance. Another term for a VNG may be a "provisioner."

To determine the computing resource vector for the VNG, the vectorization module 436 may generate a vector for each available resource 216D-H and 216P-R representing a amount of vCPU associated with that resource at the VNG level. For example, a vector quantifies a number of vCPUs for each market (e.g., instance type+region+OS) and the length of the vector corresponds to the number of allowed markets or markets meeting the resource needs.

Once the computing resource vectors are computed for each of the resources 216D-H and 216P-R, the resource distribution engine 430 may determine the resource distribution of the reclaimable resources, such as determining a distribution of instance type of the reclaimable resources. As described above, depending on the criteria for the computing resources, the resources 216D-H and 216P-R could be pooled together in a variety of combinations to meet the computing requirements. Following the weather application, if the criteria require high-processing power and storage, this could be met by various combinations of resources 216D-H and 216P-R, such as by pooling resource 216D and resource 216P together, pooling resources 216D-F together, pooling resources 216P-R together, pooling resources 216F-H and resource 216Q, or pooling resources 216F-G, and 216Q-R together.

As can be appreciated, however, each of these combinations may have different implications for service interruptions. For example, since resources 216D and 216P are both high-processing power resources, they may be not only more expensive but may be sought-after resources and as such may be prone to reclamation by the underlying cloud service provider. In another example, since the resources 216D-F are located in the same Region 1, there may be concern of a local outage or disruption interruption service. As such, the resource distribution engine 430 determines an optional distribution, both by instance type and regionality, of the resources 216D-H and 216P-R to minimize service interruption.

To determine the distribution type, the resource distribution engine 430 may compute an entropy of the instance type for the resources 216D-H and 216P-R. The entropy of the instance type may indicate a randomness in the distribution of resources 216D-H and 216P-R across the markets 414A-C. As can be appreciated, an increase in randomness in the distribution of resources is more likely to mitigate the risk of focal disruptions, such as by instance type, market, or region. By dispersing the resources, the impact of a disruption can be accounted for or compensated for by the remaining resources that are not impacted by the disruption.

The resource distribution engine 430 may compute the entropy of instance type using the following equation:

$$\text{Entropy }(M) = -\sum \frac{p * (\log p)}{\log(L(p))}$$

where,

M is one of the market 414A-C containing the vectorized resources 216D-H and 216P-R;

p is the computing vector for each resource 216D-H and 216-P-R at a given VNG level;

L equals the length of a respective vector, p;

represents the element-wise product, which can also be referred to as the Hadamard product; and log refers to the natural logarithm.

From the entropy equation, the resource distribution engine 430 may determine an entropy for the markets at a given VNG level. Based on the entropy, the distribution engine 430 may determine whether the distribution of resources at that VNG level across the respective markets provides an efficient distribution of resources. In some embodiments, the computed entropy may be compared to an entropy threshold. If the entropy is below the entropy threshold, then the resource distribution engine 430 may remove that market spread from consideration, in particular. As can be appreciated, if the entropy of a given market spread is below an entropy threshold, this may indicate that the randomness of the resources is not high enough and thus may indicate that the resources are prone to disruption.

As those skilled in the art readily appreciate, in some cases, the resource distribution engine 430 may provision resources from the same market. Since markets generally have servers 110 spread across numerous regions, regional distribution is also a consideration when the resources are pooled from the same market. Accordingly, it should be appreciated that while this description illustrates the markets 414A-C as only having one region, in reality the markets 414A-C may include multiple regions and the described approaches for determining a resource distribution, both by instance type and regionality, equally apply.

In addition to determining the entropy of a given instance type distribution, which may be determined by market, the resource distribution engine 430 may also determine a predicted availability for each resource 216D-H and 216P-R or each of the markets 414A-C. To determine the predicted availability, the resource distribution engine 430 may include a machine learning (ML) module 438. For ease of illustration, reference is now made to FIG. 4B, which illustrates an example of the ML module 438, according to an embodiment herein.

As noted above, the IMS 412 may continuously gather data on the availability and pricing of reclaimable resources within each of the markets 414A-C. This data may be submitted to the machine learning module 438 as an input 431. The ML module 438 may generate predictions 443 based on the input 431 of the availability for the reclaimable resources within each of the markets 414A-C. In an example, the ML module 438 may include a pre-processing module 433 which may process the input 431 such to clean and transform the input 431 into a data format that is consumable of the ML module 438. For example, the pre-processing module 433 may normalize, scrub, encode or decode, etc. the input 431.

The ML module 438 may include one or more machine learning (ML) models 441. For example, the one or more learning models 441 may include a neural network ML model. The ML model 441 may be trained based on historical data relating to availability, pricing, and eviction rate of resources within the markets 414A-C. In an example, the historical data may be saved in a database 435, and as new data is provided via the input 431 to the ML module 438, the ML models 441 may be continuously trained to adjust its parameters to minimize the difference between its predictions and the actual values present in the training data.

After the ML models 441 generate a prediction 443 or predictive risk score indicating a likelihood that a respective resource 216D-H and 216P-R will be reclaimed during a securement duration (e.g., the time period that the resource is secured or provisioned), the prediction 443 may be provided to an evaluation module 437 before being provided to the resource distribution engine 430. The evaluation module 437 may evaluate the accuracy of the prediction 443. As those skilled in the art readily appreciate, evaluation of the prediction may be done using metrics, such as accuracy, precision, recall, F1 score, and the like.

By generating the prediction 443 for a given input 431, the ML module 438 may identify availability zones and generate predictions of availability for reclaimable resources across the markets 414A-C. In some cases, the ML module 438 may generate a predictive risk score that indicates the likelihood that the respective resources 216D-H and 216P-R will be reclaimed (e.g., predict the eviction rate). In other cases, the prediction 443 (e.g., risk score) is generated based on the market. For example, the ML model 438 may generate a risk score for each of the markets 414A-C that indicates the likelihood that the respective resources within that market will be reclaimed during the securement duration.

Returning now to FIG. 4A, once the resource distribution engine 430 determines a risk score and the entropy of a given resource or market, the resource distribution engine 430 may perform an optimization process. For example, the resource distribution engine 430 may include an optimization module 434. The optimization module 434 may perform an optimization process in which the markets 414A-C or resource distributions are optimized based on specified criteria. The optimization process may include the following equation:

$$\text{Rank Score} = \text{Price}(M) + a * \text{Risk-score}(M) + b * \text{Entropy}(M)$$

where,

M is for a given market; and a and b are hyperparameters for calibration. The values of the hyperparameters may vary depending on how much emphasis or weight is given to each factor. For instance, if price and risk score are normalized to be between 0 and 1, then "a" may be set to 0.1.

As shown above, the optimization process may include an equation containing a price variable, risk score variable, and an entropy variable for each of the markets or resource distributions. The resource distribution engine 430 may select which of these variables the optimization module 434 should solve or optimize for. The selection of which variable to optimize for may be set by a user, the application service 402, the cluster orchestrator 428, or IMS 412. For example, the cluster orchestrator 428 may indicate that entropy is most important and as such, the optimization module 434 may solve the optimization process for entropy. In another scenario, if no criteria have been provided by the user, the application service 402, or the cluster orchestrator 428, the IMS 412 may indicate that the optimization process should optimize the price or cost of securing the resources.

Once the rank score is generated for each of the markets or resource distributions, the optimization module 434 may rank or sort the rank scores to determine the distribution. If more than one market or resource distribution has the same rank score, then the resource distribution engine 430 may select the market or resource distribution having the lowest prices or cost. The selected market or resource distribution may be determined as the resource distribution.

After the resource distribution is determined, the IMS 412 may secure the respective resources 216D-H and 216P-R (e.g., the subset of the reclaimable resources that are within the identified optimal resource distribution) (546). Once secured, the respective resources 216D-H and 216P-R may be referred to as provisioned reclaimable resources. Once secured, the IMS 412 may transmit an indication of the provisioned reclaimable resources to the cluster orchestrator 428. (548).

In some embodiments, the IMS 412 may coordinate the establishment of a connection 439 between the cluster orchestrator 428 and the provisioned reclaimable resources. That is, the IMS 412 may orchestrate the integration process of the provisioned reclaimable resources into the cluster orchestrator 428. For example, the IMS 412 may oversee the registration of the provisioned reclaimable resources as worker nodes within a control plane associated with the cluster orchestrator 428. By facilitating the connection 439, the IMS 412 enables the cluster orchestrator 428 to effectively schedule and distribute workloads across both provisioned reclaimable resources and other types of worker nodes.

Figure 6:
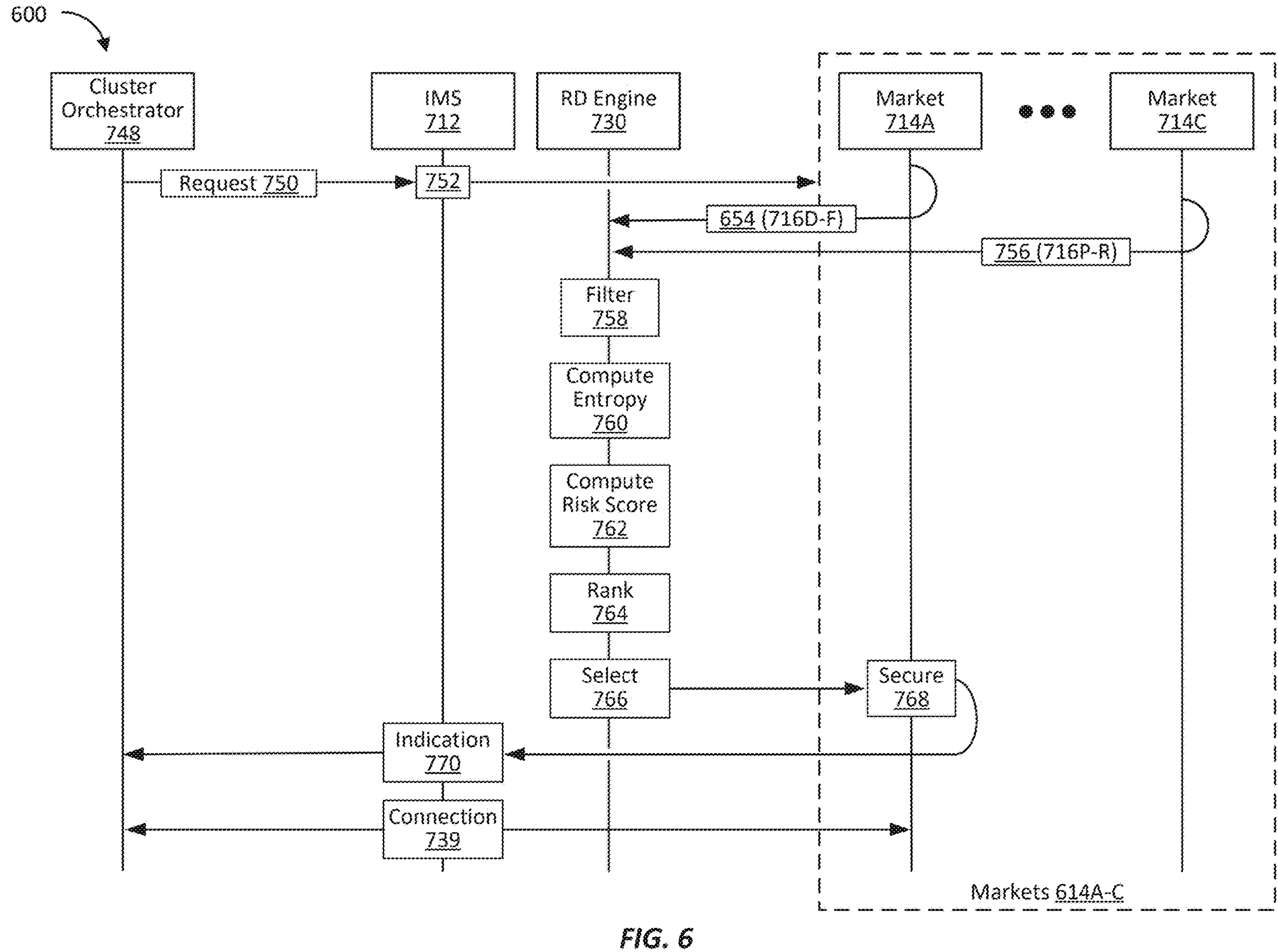
FIG. 6 illustrates an example process for allocating and securing reclaimable resources using a resource distribution engine, according to an embodiment herein.

Referring now to FIG. 6, an example process 600 for allocating and securing reclaimable resources using a resource distribution engine is illustrated, according to an embodiment herein. For ease of explanation, FIG. 6 is described with reference to the preceding FIGS. 1-5, however, it should be appreciated that the following discussion is equally applicable to other Figures provided herein, including FIGS. 7 and 8.

As shown, the process 600 includes a cluster orchestrator 648, which may be the same or similar to the cluster orchestrators 148 and/or 448, transmits a request 650 to an IMS (IMS) 612. The IMS 612 may be the same or similar to the IMS 112 and/or IMS 412. As such, the IMS 612 may receive the request 650 and query 652 or otherwise determine which of the markets 614A-C have resources available for provisioning. In particular, the IMS 612 may query 652 the markets 614A-C to determine if any computing resources within each respective market are available for provisioning. In such a scenario, the IMS 612 may query 652 the markets 614A-C for available reclaimable resources. Responsive to the query 652, the markets 614A-C may indicate that reclaimable resources 614D-F and 614P-R are available for the requested time period. For example, an indication 654 from the market 614A and an indication 656 from the market 614C may be transmitted indicating that the resources 616D-F and 616P-R are available, respectively.

The IMS 612 may include a resource distribution engine 630. As such, the resource distribution engine 630 may receive the indications 654 and 656. Responsive to receiving the indications 654 and 656, the resource distribution engine 630 may filter 658 the identified resources 616D-F and 616P-R based on criteria provided in the request, as described above. For example, the resource distribution engine 630 may include a criteria module, such as the criteria module 432, that filters 658 the resources 616D-F and 616P-R based on the requested criteria to remove unsuitable resources.

Once the unsuitable resources are removed, the resource distribution engine 630 may determine a resource distribution for the resources 616D-F and 616P-R (e.g., filtered suitable resources). In particular, the resource distribution engine 630 may compute an entropy 660 for each of the markets 614A-C. As described above, to compute the entropy 660 for each market, the resource distribution engine 630 may include a vectorization module, such as the vectorization module 436, that generates a computing resource vector for each of the resource 616D-F and 616P-R based on a VNG level within each of the markets 616A-C. Once the vectors are computed, the resource distribution engine 630 computes the entropy 660 or randomness of the distribution of the resources 616D-F and 616P-R across the markets 616A-C.

The resource distribution engine 630 may also compute a risk score 662 for each of the markets 614A-C. As noted above, the risk score 662 may indicate a likelihood that the resources 616D-F and 616P-R within a respective market may be reclaimed during a securement duration. In other words, the risk score 662 may be a predictive availability of a given resource. The risk score 662 may be generated based on historical data for a given market. As described above, the resource distribution engine 630 may include a ML module 438 that monitors each market 616A-C and gathers data on resource availability and pricing. Based on this historical data, the ML module 438 can compute a risk score 662 for each market and the available resources 616AD-F and 616P-R.

Once the entropy 660 and the risk score 662 for each of the markets 616A-C are generated, the resource distribution engine 630 may rank the resource distributions within each market 616A-C to determine a distribution. In some cases, the price for each market 616A-C may also be considered, as described above. As part of determining the rank 664 for each of the markets 616A-C, the resource distribution engine 630 may perform an optimization process, in which a rank score is generated for each resource distribution or market by optimizing one of the rank 664, the risk score 662, and/or price.

Once the rank 664 is determined for each of the distributions or markets, the resource distribution engine 630 may select 666 a resource distribution or market for provisioning a subset of the resources 616D-F and 616P-R. In the illustrated example, the resource distribution engine 630 may select 666 the resources 616D-F. As such, the resource distribution engine 630 may transmit an indication to secure 668 the resources 646D-F to the market 614A. As can be appreciated, once the resources 616D-F are secured, the market 614A may provide an indication that the resources 616D-F are provisioned. Once the IMS 612 receives the indication that the resources 616D-F are provisioned, the IMS 612 may transmit an indication 670 to the cluster orchestrator 648 that the resources 616D-F are provisioned. In some cases, the IMS 612 may also coordinate establishment of a connection 639 between the market 614A and/or the resources 616D-F and the cluster orchestrator 648.

Figure 7:
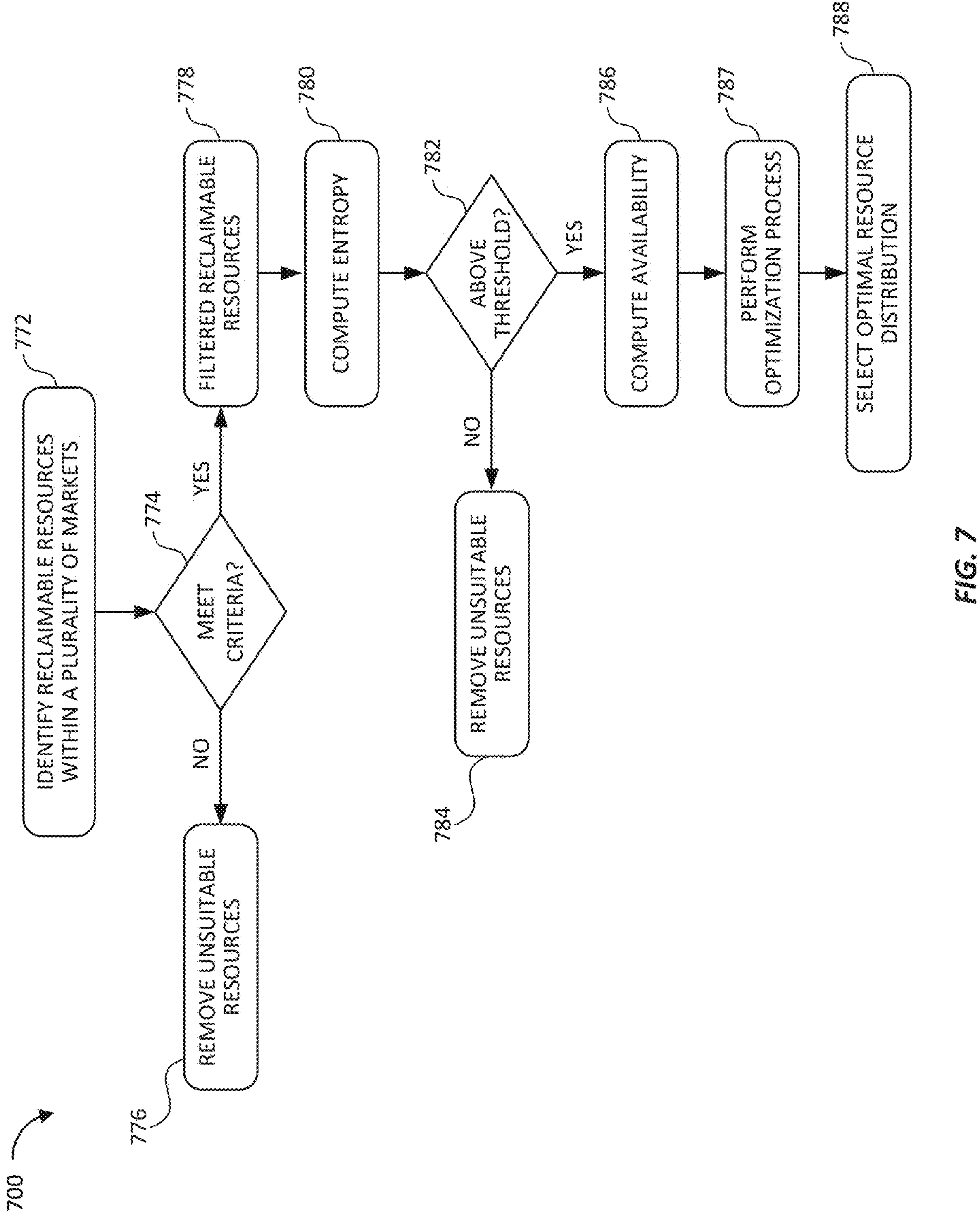
FIG. 7 illustrates an example resource distribution process, according to an embodiment herein.

Referring now to FIG. 7, an example resource distribution process 700 is illustrated, according to an embodiment herein. The resource distribution process 700 may be performed by an instance management service, such as the IMS 112, 412, or 612. For ease of illustration, the process 700 is made with reference to FIG. 4A, however, it should be appreciated that the process 700 may be equally applicable to the remaining Figures.

At step 772, the IMS 412 may identify reclaimable resources within a plurality of markets, such as the resources 216D-H and 216P-R within the markets 414A-C. These resources 216D-H and 216P-R may be representative of the available resources within the markets 414A-C. Once the resources 216D-H and 216P-R are identified as available within the markets 414A-C, the IMS 412 may determine if any of these resources 216D-H and 216P-R fail to meet the criteria provided within a request for provisioning the computing resources, at step 774. For example, the IMS 412 may determine one or more of the resources 216D-H and 216P-R fail to meet the criteria and as such are unsuitable resources. As such, at step 776, the IMS 412 may remove the unsuitable resources from consideration. Once the unsuitable resources are removed, the IMS 412 may identify the remaining resources 216D-H and 216P-R at 778 for processing to determine a resource distribution.

At step 780, the IMS 412 may perform an initial step of the resource distribution process in which an entropy for each of the resources 216D-H and 216P-R is determined. As noted above, an entropy may be computed on a per market basis or on a per distribution basis. Once the entropy is computed at 780, the IMS 412 may compare each of the computed entropies to an entropy threshold at step 782. If a respective entropy, for example the entropy of the resources within the market 414A is below the entropy threshold, then the IMS 412 may remove the resources 216D-F that are within the market 414A at step 784 as unsuitable resources.

If an entropy for a given market, market-spread or distribution is above the entropy threshold, then the IMS 412 may compute an availability for the resources within that market of distribution at 786. As described above, the IMS 412 may use machine learning and/or historical data to generate a predicted availability for each resource 216D-H and 216P-R and/or market 414A-C. In some cases, the IMS 412 may compute a risk score that indicates the likelihood that a resource 216D-H and 216P-R will be reclaimed during a securement duration.

At step 787, the IMS 412 may perform an optimization process. The optimization process may analyze the entropy and predicted availability of each of the resource 216D-H and 216P-R and/or market 414A-C in view of a price to provision the respective resources. As described above, the optimization process can be solved to optimize one of the entropy, availability, or price for each resource 216D-H and 216P-R and/or markets 414A-C. In some cases, the entropy and/or predicted availability can be filtered and then the optimization process may be performed. In an example, an optimization process for balancing (e.g., spreading servers), pricing, and availability may be performed, depending on the application and desired outcome.

Once the optimization process is performed, a rank score for each of the resources 216D-H and 216P-R and/or markets 414A-C may be generated and ranked. Based on the rank score, the IMS 412 may select a resource distribution at 788. As described above, once selected, the IMS 412 may secure or otherwise provision the respective resources that are within the resource distribution.

Referring now to FIG. 8, is a diagram of a system 800 configured to provide a resource distribution engine and/or implement one or more steps of a resource distribution process described herein, according to an embodiment. The system 800 may be an example of an apparatus including a computing apparatus 890 that is representative of any system or collection of systems in which the various processes, systems, programs, services, and scenarios disclosed herein may be implemented. For example, computing apparatus 890 may be an example node, such as the storage node 205B, or may be a client device, such as the client device 106, or any of the subcomponents depicted in systems 100 or 400 of FIGS. 1 and 4, respectively. Examples of computing apparatus 890 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing apparatus 890 may be implemented as a single apparatus, system, or device or may be implemented in a distributed manner as multiple apparatuses, systems, or devices. Computing apparatus 890 may include, but is not limited to, processing system 898, storage system 892, software 894, communication interface system 897, and user interface system 899. Processing system 898 may be operatively coupled with storage system 892, communication interface system 897, and user interface system 899.

Processing system 898 may load and execute software 894 from storage system 892. Software 894 may include a resource distribution process 896, which may be representative of one or more steps of the resource distribution processes or processes for providing a resource distribution engine, as discussed with respect to the preceding figures. When executed by processing system 898, software 894 may direct processing system 898 to operate as described herein for at least the various processes, such as the processes 500, 600, and 700, operational scenarios, and sequences discussed in the foregoing implementations. Computing apparatus 990 may optionally include additional devices, features, or functionality not discussed for purposes of brevity.

In some embodiments, processing system 898 may comprise a micro-processor and other circuitry that retrieves and executes software 894 from storage system 892. Processing system 898 may be implemented within a single processing device but may also be distributed across multiple processing devices or sub-systems that cooperate in executing program instructions. Examples of processing system 898 may include general purpose central processing units, graphical processing units, application specific processors, and logic devices, as well as any other type of processing device, combinations, or variations thereof.

Storage system 892 may comprise any memory device or computer readable storage media readable by processing system 898 and capable of storing software 894. Storage system 892 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 892 may also include computer readable communication media over which at least some of software 894 may be communicated internally or externally. Storage system 892 may be implemented as a single storage device but may also be implemented across multiple storage devices or sub-systems co-located or distributed relative to each other. Storage system 892 may comprise additional elements, such as a controller, capable of communicating with processing system 898 or possibly other systems.

Software 894 (including resource distribution process 896 among other functions) may be implemented in program instructions that may, when executed by processing system 898, direct processing system 898 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 894 may include additional processes, programs, or components, such as operating system software, virtualization software, or other application software. Software 894 may also comprise firmware or some other form of machine-readable processing instructions executable by processing system 898.

In general, software 894 may, when loaded into processing system 898 and executed, transform a suitable apparatus, system, or device (of which computing apparatus 990 is representative) overall from a general-purpose computing system into a special-purpose computing system as described herein. Indeed, encoding software 894 on storage system 892 may transform the physical structure of storage system 892. The specific transformation of the physical structure may depend on various factors in different implementations of this description. Examples of such factors may include, but are not limited to, the technology used to implement the storage media of storage system 892 and whether the computer-storage media are characterized as primary or secondary storage, as well as other factors.

For example, if the computer readable storage media are implemented as semiconductor-based memory, software 894 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 897 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between the computing apparatus 990 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer-readable storage medium(s) having computer readable program code embodied thereon.

The foregoing examples and descriptions are described herein in the context of systems and methods for providing a resource distribution engine. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method comprising: identifying, by an instance management service, a request from a cluster orchestrator to acquire computing resources associated with deployment of an application; determining, by the instance management service, a plurality of markets containing reclaimable resources suitable for the computing resources; performing, by a resource distribution engine of the instance management service, a resource distribution process to determine a resource distribution of the reclaimable resources within the plurality of markets, wherein the resource distribution of the reclaimable resources comprises a distribution of instance type of the reclaimable resources; securing, by the instance management service, the reclaimable resources identified by the resource distribution as provisioned reclaimable resources; and transmitting, by the instance management service, an indication of the provisioned reclaimable resources to the cluster orchestrator.

Example 2 is the method of any previous or subsequent Example, wherein performing, by the resource distribution engine, the resource distribution process to determine the resource distribution of the reclaimable resources within the plurality of markets comprises: determining, by the resource distribution engine, a computing resource vector for each virtual node group (VNG) within each of the plurality of markets; and computing, by the resource distribution engine, an entropy of the instance type for the reclaimable resources as distributed within the plurality of markets based on the computing resource vectors determined for each of the plurality of markets, wherein the distribution of instance type of the reclaimable resources is based on the entropy of the instance type for the reclaimable resources.

Example 3 is the method of any previous or subsequent Example, wherein the resource distribution engine comprises a machine learning (ML) model, and performing, by the resource distribution engine, the resource distribution process to determine the resource distribution of the reclaimable resources within the plurality of markets comprises: generating, by the ML model of the resource distribution engine, a risk score for each market within the plurality of markets, wherein: the risk score indicates a likelihood that a respective reclaimable resource is to be reclaimed during a securement duration; and the ML model generates the risk score for each market within the plurality of markets based on historical data of each market; and determining, by the resource distribution engine, the resource distribution based, in part, on the risk score for each market.

Example 4 is the method of any previous or subsequent Example, wherein performing, by the resource distribution engine, the resource distribution process to determine the resource distribution of the reclaimable resources within the plurality of markets comprises: determining, by the resource distribution engine, a regional distribution of the reclaimable resources within the plurality of markets; and determining, by the resource distribution engine, a regional distribution of the reclaimable resources within the plurality of markets, wherein the resource distribution of the reclaimable resources comprises the regional distribution of the reclaimable resources.

Example 5 is the method of any previous or subsequent Example, wherein the resource distribution process to determine the resource distribution of the reclaimable resources within the plurality of markets comprises an optimization process based on a price for each of the plurality of markets, a risk score for each market within the plurality of markets, and an entropy of instance type for the reclaimable resources as distributed within the plurality of markets.

Example 6 is the method of any previous or subsequent Example, wherein performing, by the resource distribution engine, the resource distribution process to determine the resource distribution of the reclaimable resources within the plurality of markets comprises: determining, by the resource distribution engine, one or more criteria for identifying suitable computing resources based on the request; identifying, by the resource distribution engine, one or more unsuitable reclaimable resources from the reclaimable resources based on the one or more criteria; and removing, by the resource distribution engine, the one or more unsuitable reclaimable resources from the reclaimable resources.

Example 7 is the method of any previous or subsequent Example, wherein the method further comprises: establishing, by the instance management service, one or more communication channels between the provisioned reclaimable resources and the cluster orchestrator.

Example 8 is a computing apparatus comprising: a computer-readable storage medium; processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least: determine a plurality of markets containing reclaimable resources; perform a resource distribution process to determine a resource distribution of the reclaimable resources within the plurality of markets, wherein the resource distribution comprises a distribution of instance type of the reclaimable resources; and secure the reclaimable resources identified by the resource distribution as provisioned reclaimable resources.

Example 9 is the computing apparatus of any previous or subsequent Example, wherein the processor-executable instructions to perform the resource distribution process to determine the resource distribution of the reclaimable resources, when executed by the one or more processors, further direct the computing apparatus to: compute an entropy of the instance type for the reclaimable resources as distributed within the plurality of markets based on computing resource vectors of each of the plurality of markets; and determine a risk score for each market within the plurality of markets, wherein the risk score indicates a predicted availability of a respective reclaimable resource during a securement duration.

Example 10 is the computing apparatus of any previous or subsequent Example, wherein the processor-executable instructions to perform the resource distribution process to determine the resource distribution of the reclaimable resources, when executed by the one or more processors, further direct the computing apparatus to: determine a regional distribution of the reclaimable resources within the plurality of markets, wherein the resource distribution of the reclaimable resources comprises the regional distribution of the reclaimable resources.

Example 11 is the computing apparatus of any previous or subsequent Example, wherein the processor-executable instructions to perform the resource distribution process to determine the resource distribution of the reclaimable resources, when executed by the one or more processors, further direct the computing apparatus to: determine a computing resource vector for each virtual node group (VNG) within each of the plurality of markets; and compute an entropy of the instance type for the reclaimable resources as distributed within the plurality of markets based on the computing resource vectors determined for each of the plurality of markets, wherein the distribution of instance type of the reclaimable resources is based on the entropy of the instance type for the reclaimable resources.

Example 12 is the computing apparatus of any previous or subsequent Example, wherein the processor-executable instructions to perform the resource distribution process to determine the resource distribution of the reclaimable resources, when executed by the one or more processors, further direct the computing apparatus to: determine one or more criteria for identifying suitable computing resources; and filter the reclaimable resources to remove one or more unsuitable reclaimable resources based on the one or more criteria.

Example 13 is the computing apparatus of any previous or subsequent Example, wherein the processor-executable instructions, when executed by the one or more processors, further direct the computing apparatus to: filter the reclaimable resources by price to remove unsuitable reclaimable resources from filtered reclaimable resources; and the processor-executable instructions to perform the resource distribution process to determine the resource distribution of the reclaimable resources, when executed by the one or more processors, further direct the computing apparatus to: perform the resource distribution process to determine the resource distribution of the filtered reclaimable resources.

Example 14 is the computing apparatus of any previous or subsequent Example, wherein the processor-executable instructions to perform the resource distribution process to determine the resource distribution of the reclaimable resources, when executed by the one or more processors, further direct the computing apparatus to: determine a region for each of the reclaimable resources within the plurality of markets; compute a plurality of regional distributions based on the regions for each of the reclaimable resources; and determine a regional distribution from the plurality of regional distributions.

Example 15 is a computer-readable storage medium comprising processor-executable instructions configured to cause one or more processors to: identify a request from a cluster orchestrator to acquire computing resources associated with deployment of an application; determine one or more markets containing reclaimable resources suitable for the computing resources; perform a resource distribution process to determine a resource distribution of the reclaimable resources within the one or more markets, wherein the resource distribution of the reclaimable resources comprises a distribution of instance type of the reclaimable resources across the one or more markets; secure the reclaimable resources identified by the resource distribution as provisioned reclaimable resources; and transmit an indication of the provisioned reclaimable resources to the cluster orchestrator.

Example 16 is the computer-readable storage medium of any previous or subsequent Example, wherein the request from the cluster orchestrator identifies one or more criteria for suitable computing resources, and the processor-executable instructions to perform the resource distribution process to determine the resource distribution of the reclaimable resources cause the one or more processors to further execute processor-executable instructions stored in the computer-readable storage medium to: filter the reclaimable resources based on the one or more criteria to remove unsuitable reclaimable resources from filtered reclaimable resources; compute an entropy of the instance type for the filtered reclaimable resources as distributed within the one or more markets based on computing resource vectors of each of the one or more markets; and determine a risk score for each market within the one or more markets associated with the filtered reclaimable resources, wherein the risk score indicates a predicted availability of a respective reclaimable resource during a securement duration.

Example 17 is the computer-readable storage medium of any previous or subsequent Example, wherein the resource distribution process comprises an optimization process, and the processor-executable instructions to perform the resource distribution process to determine the resource distribution of the reclaimable resources cause the one or more processors to further execute processor-executable instructions stored in the computer-readable storage medium to: perform the optimization process to optimize one of: predicted availability of respective reclaimable resources within the one or more markets; a price associated with securing the reclaimable resources; or an entropy of instance type distributed within the one or more markets; and determine the reclaimable resources associated with the resource distribution based on the optimization process.

Example 18 is the computer-readable storage medium of any previous or subsequent Example, wherein the processor-executable instructions to perform the resource distribution process to determine the resource distribution of the reclaimable resources cause the one or more processors to further execute processor-executable instructions stored in the computer-readable storage medium to: determine a computing resource vector for each virtual node group (VNG) within each of the one or more markets; compute an entropy of the instance type for the reclaimable resources as distributed within the one or more markets based on the computing resource vectors determined for each of the one or more markets; and determine the distribution of instance type of the reclaimable resources based on the entropy of the instance type exceeding an entropy threshold.

Example 19 is the computer-readable storage medium of any previous or subsequent Example, wherein the processor-executable instructions to perform the resource distribution process to determine the resource distribution of the reclaimable resources cause the one or more processors to further execute processor-executable instructions stored in the computer-readable storage medium to: determine a risk score for each market within the one or more markets, wherein the risk score indicates a likelihood that a respective reclaimable resource is to be reclaimed during a securement duration, wherein the resource distribution engine determines the resource distribution based, in part, on the risk score for each market.

Example 20 is the computer-readable storage medium of any previous or subsequent Example, wherein the processor-executable instructions stored in the computer-readable storage medium are further configured to cause the one or more processors to: establish one or more communication channels between the provisioned reclaimable resources and the cluster orchestrator.

What is claimed is:

1. A method comprising:

identifying, by an instance management service, a request from a cluster orchestrator to acquire computing resources associated with deployment of an application;

determining, by the instance management service, a plurality of markets containing reclaimable resources suitable for the computing resources;

performing, by a resource distribution engine of the instance management service, a resource distribution process to determine a resource distribution of the reclaimable resources within the plurality of markets, wherein the resource distribution of the reclaimable resources comprises a distribution across a plurality of different instance types of the reclaimable resources, wherein performing the resource distribution process comprises:

determining, by the resource distribution engine, a plurality of virtual node groups (VNGs), each VNG comprising a candidate grouping of the reclaimable resources within the plurality of markets;

determining, by the resource distribution engine, a computing resource vector for each reclaimable resource included in each virtual node group (VNG);

computing, by the resource distribution engine, for each VNG, an entropy of the instance type for the reclaimable resources included in that VNG based on the computing resource vectors of the reclaimable resources included in that VNG, wherein each entropy indicates a degree of randomness in a distribution of the reclaimable resources of that VNG across the plurality of markets;

excluding, by the resource distribution engine, VNGs whose entropy is below a threshold; and selecting, by the resource distribution engine, a VNG from among the remaining VNGs;

securing, by the instance management service, the reclaimable resources included in the selected VNG as provisioned reclaimable resources; and transmitting, by the instance management service, an indication of the provisioned reclaimable resources to the cluster orchestrator.

2. The method of claim 1, wherein determining, by the resource distribution engine, the distribution across the plurality of different instance types comprises:

adjusting, by the resource distribution engine, the distribution to increase diversity of instance types across the plurality of markets based on the entropy computed for the instance types.

3. The method of claim 1, wherein the resource distribution engine comprises a machine learning (ML) model, and performing, by the resource distribution engine, the resource distribution process to determine the resource distribution of the reclaimable resources within the plurality of markets comprises:

generating, by the ML model of the resource distribution engine, a risk score for each market within the plurality of markets, wherein:

the risk score indicates a likelihood that a respective reclaimable resource is to be reclaimed during a securement duration; and the ML model generates the risk score for each market within the plurality of markets based on historical data of each market; and determining, by the resource distribution engine, the resource distribution based, in part, on the risk score for each market.

4. The method of claim 1, wherein performing, by the resource distribution engine, the resource distribution process to determine the resource distribution of the reclaimable resources within the plurality of markets comprises:

determining, by the resource distribution engine, a regional distribution of the reclaimable resources within the plurality of markets; and determining, by the resource distribution engine, a regional distribution of the reclaimable resources within the plurality of markets, wherein the resource distribution of the reclaimable resources comprises the regional distribution of the reclaimable resources.

5. The method of claim 1, wherein the resource distribution process to determine the resource distribution of the reclaimable resources within the plurality of markets comprises an optimization process based on a price for each of the plurality of markets, a risk score for each market within the plurality of markets, and an entropy of instance type for the reclaimable resources as distributed within the plurality of markets.

6. The method of claim 1, wherein performing, by the resource distribution engine, the resource distribution process to determine the resource distribution of the reclaimable resources within the plurality of markets comprises:

determining, by the resource distribution engine, one or more criteria for identifying suitable computing resources based on the request;

identifying, by the resource distribution engine, one or more unsuitable reclaimable resources from the reclaimable resources based on the one or more criteria; and removing, by the resource distribution engine, the one or more unsuitable reclaimable resources from the reclaimable resources.

7. The method of claim 1, wherein the method further comprises:

establishing, by the instance management service, one or more communication channels between the provisioned reclaimable resources and the cluster orchestrator.

8. A computing apparatus comprising:

a computer-readable storage medium;

processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least:

determine a plurality of markets containing reclaimable resources;

perform, by a resource distribution engine of an instance management service, a resource distribution process to determine a resource distribution of the reclaimable resources within the plurality of markets, wherein the resource distribution comprises a distribution across a plurality of different instance types of the reclaimable resources, wherein performing the resource distribution process comprises:

determining, by the resource distribution engine, a plurality of virtual node groups (VNGs), each VNG comprising a candidate grouping of the reclaimable resources within the plurality of markets;

determining, by the resource distribution engine, a computing resource vector for each reclaimable resource included in each virtual node group (VNG) within each of the plurality of markets;

computing, by the resource distribution engine, for each VNG, an entropy of the instance type for the reclaimable resources included in that VNG based on the computing resource vectors of the reclaimable resources included in that VNG, wherein each entropy indicates a degree of randomness in a distribution of the reclaimable resources of that VNG across the plurality of markets;

excluding, by the resource distribution engine, VNGs whose entropy is below a threshold; and selecting, by the resource distribution engine, a VNG from among the remaining VNGs; and secure the reclaimable resources included in the selected VNG as provisioned reclaimable resources.

9. The computing apparatus of claim 8, wherein the processor-executable instructions, when executed by the oneor more processors, further direct the computing apparatus to:

determine a risk score for each market within the plurality of markets, wherein the risk score indicates a predicted availability of a respective reclaimable resource during a securement duration.

10. The computing apparatus of claim 8, wherein the processor-executable instructions to perform the resource distribution process to determine the resource distribution of the reclaimable resources, when executed by the one or more processors, further direct the computing apparatus to:

determine a regional distribution of the reclaimable resources within the plurality of markets, wherein the resource distribution of the reclaimable resources comprises the regional distribution of the reclaimable resources.

11. The computing apparatus of claim 8, wherein the processor-executable instructions to determine the distribution across the plurality of different instance types, when executed by the one or more processors, further direct the computing apparatus to:

adjust the distribution to increase diversity of instance types across the plurality of markets based on the entropy computed by the instance types.

12. The computing apparatus of claim 8, wherein the processor-executable instructions to perform the resource distribution process to determine the resource distribution of the reclaimable resources, when executed by the one or more processors, further direct the computing apparatus to:

determine one or more criteria for identifying suitable computing resources; and filter the reclaimable resources to remove one or more unsuitable reclaimable resources based on the one or more criteria.

13. The computing apparatus of claim 8, wherein the processor-executable instructions, when executed by the one or more processors, further direct the computing apparatus to:

filter the reclaimable resources by price to remove unsuitable reclaimable resources from filtered reclaimable resources; and the processor-executable instructions to perform the resource distribution process to determine the resource distribution of the reclaimable resources, when executed by the one or more processors, further direct the computing apparatus to:

perform the resource distribution process to determine the resource distribution of the filtered reclaimable resources.

14. The computing apparatus of claim 8, wherein the processor-executable instructions to perform the resource distribution process to determine the resource distribution of the reclaimable resources, when executed by the one or more processors, further direct the computing apparatus to:

determine a region for each of the reclaimable resources within the plurality of markets;

compute a plurality of regional distributions based on the regions for each of the reclaimable resources; and determine a regional distribution from the plurality of regional distributions.

15. A computer-readable storage medium comprising processor-executable instructions configured to cause one or more processors to:

identify a request from a cluster orchestrator to acquire computing resources associated with deployment of an application;

determine one or more markets containing reclaimable resources suitable for the computing resources;

perform a resource distribution process to determine a resource distribution of the reclaimable resources within the one or more markets, wherein the resource distribution of the reclaimable resources comprises a distribution across a plurality of different instance types of the reclaimable resources, wherein performing the resource distribution process comprises:

determining, by the resource distribution engine, a plurality of virtual node groups (VNGs), each VNG comprising a candidate grouping of the reclaimable resources within the plurality of markets;

determining, by the resource distribution engine, a computing resource vector for each reclaimable resource included in each virtual node group (VNG);

computing, by the resource distribution engine, for each VNG, an entropy of the instance type for the reclaimable resources included in that VNG based on the computing resource vectors of the reclaimable resources included in that VNG, wherein each entropy indicates a degree of randomness in a distribution of the reclaimable resources of that VNG across the plurality of markets;

excluding, by the resource distribution engine, VNGs whose entropy is below a threshold; and selecting, by the resource distribution engine, a VNG from among the remaining VNGs;

secure, by the instance management service, the reclaimable resources included in the selected VNG as provisioned reclaimable resources; and transmit an indication of the provisioned reclaimable resources to the cluster orchestrator.

16. The computer-readable storage medium of claim 15, wherein the request from the cluster orchestrator identifies one or more criteria for suitable computing resources, and the processor-executable instructions to perform the resource distribution process to determine the resource distribution of the reclaimable resources cause the one or more processors to further execute processor-executable instructions stored in the computer-readable storage medium to:

filter the reclaimable resources based on the one or more criteria to remove unsuitable reclaimable resources from filtered reclaimable resources;

compute an entropy of the instance type for the filtered reclaimable resources as distributed within the one or more markets based on computing resource vectors of each of the one or more markets; and determine a risk score for each market within the one or more markets associated with the filtered reclaimable resources, wherein the risk score indicates a predicted availability of a respective reclaimable resource during a securement duration.

17. The computer-readable storage medium of claim 15, wherein the resource distribution process comprises an optimization process, and the processor-executable instructions to perform the resource distribution process to determine the resource distribution of the reclaimable resources cause the one or more processors to further execute processor-executable instructions stored in the computer-readable storage medium to:

perform the optimization process to optimize one of:

predicted availability of respective reclaimable resources within the one or more markets;

a price associated with securing the reclaimable resources; or an entropy of instance type distributed within the one or more markets; and determine the reclaimable resources associated with the resource distribution based on the optimization process.

18. The computer-readable storage medium of claim 15, wherein the processor-executable instructions to determine the distribution across the plurality of different instance types cause the one or more processors to further execute processor-executable instructions stored in the computer-readable storage medium to:

adjust the distribution to increase diversity of instance types across the plurality of markets based on the entropy computed by the instance types.

19. The computer-readable storage medium of claim 15, wherein the processor-executable instructions to perform the resource distribution process to determine the resource distribution of the reclaimable resources cause the one or more processors to further execute processor-executable instructions stored in the computer-readable storage medium to:

determine a risk score for each market within the one or more markets, wherein the risk score indicates a likelihood that a respective reclaimable resource is to be reclaimed during a securement duration, wherein the resource distribution engine determines the resource distribution based, in part, on the risk score for each market.

20. The computer-readable storage medium of claim 15, wherein the processor-executable instructions stored in the computer-readable storage medium are further configured to cause the one or more processors to:

establish one or more communication channels between the provisioned reclaimable resources and the cluster orchestrator.

* * * * *